(12) United States Patent
Karutz et al.

(10) Patent No.: US 8,384,618 B2
(45) Date of Patent: Feb. 26, 2013

(54) DISPLAY APPARATUS

(75) Inventors: Frank-Oliver Karutz, Stuttgart (DE); Birgit Rottenkolber, Koesching (DE); Norbert Wurscher, Aalen (DE); Bertold Engler, Altenstieg (DE); Klaus Beck, Singapore (SG)

(73) Assignee: Carl Zeiss AG, Oberkochen (DE)

( * ) Notice: Subject to any disclaimer, the term of this patent is extended or adjusted under 35 U.S.C. 154(b) by 1153 days.

(21) Appl. No.: 12/262,756

(22) Filed: Oct. 31, 2008

(65) Prior Publication Data

US 2009/0121971 A1 May 14, 2009

(30) Foreign Application Priority Data

Nov. 8, 2007 (DE) .......................... 10 2007 053 282

(51) Int. Cl.
*G09G 5/00* (2006.01)

(52) U.S. Cl. .......................................... 345/8

(58) Field of Classification Search ........ 345/8; 348/53, 348/115; 359/630
See application file for complete search history.

(56) References Cited

U.S. PATENT DOCUMENTS

| 5,589,846 | A | | 12/1996 | Kobayashi |
| 5,880,773 | A | * | 3/1999 | Suzuki .......................... 348/115 |
| 6,091,546 | A | * | 7/2000 | Spitzer ........................... 359/618 |
| 6,448,944 | B2 | * | 9/2002 | Ronzani et al. .................... 345/8 |
| 2004/0160572 | A1 | | 8/2004 | Jannard et al. |

FOREIGN PATENT DOCUMENTS

| EP | 0 588 216 A1 | 3/1994 |
| FR | 1 295 891 | 6/1962 |
| JP | 11142796 A | 5/1999 |
| JP | 11237583 A | 8/1999 |

* cited by examiner

*Primary Examiner* — Abbas Abdulselam

(74) *Attorney, Agent, or Firm* — Patterson Thuente Christensen Pedersen, P.A.

(57) ABSTRACT

A display apparatus which comprises an image module for generating an image, a spectacle-like frame which carries the image module, and wherein the spectacle-like frame comprises a front portion with a nose support, as well as two lateral temples mounted to the front portion. At least one of the temples has shiftably mounted to it a holding element. The holding element comprises a first portion extending downwards from the temple, and a second portion connected with the lower end of the first portion, the second portion extending from the lower end of the first portion in a direction pointing away from the front portion.

16 Claims, 4 Drawing Sheets

DISPLAY APPARATUS

PRIORITY APPLICATION

The current application claims the benefit of priority to German Patent Application No. DE 10 2007 053 282.4 filed on Nov. 8, 2007. Said application is incorporated in its entirety by reference herein.

FIELD OF THE DISCLOSURE

The present invention relates generally to the field of display apparatuses. More specifically, the present invention relates to a display apparatus comprising an image module for generating an image and a spectacle-like frame, which carries the image module and has a front portion with a nose support, as well as two lateral temples mounted to the front portion. Such display apparatuses are often referred to as HMD apparatuses (Head-Mounted Display apparatuses).

BACKGROUND OF THE INVENTION

Generally for head-mounted displays (HMD's), the image module is carried by the spectacle-like frame and can be heavy, as compared to the spectacle-like frame. Due to the image module being carried by the spectacle-like frame, these head-mounted display apparatuses have the problem that the display apparatus has a relative preponderance of weight in the region of the nose support. Therefore, such HMD apparatuses can easily slip down from the nose, so that the user can no longer perceive the image optimally. In particular, headaches may be caused by the HMD apparatus sitting too low on the nose.

One solution to the problem of the HMD apparatus slipping down from the nose is to provide a holding band extending from the free end of one temple, around the back of the head and up to the free end of the other temple. However, this is problematic in that the user's hairdo may be indented in the region of the holding band under certain circumstances. Further, hairs may get caught in the holding band. Also, the length of the holding band, which is usually a rubber band, must be neither too short nor too long. In many cases the holding band is under too much tension, so that an unpleasant pressure is exerted on the user's nose and head by the display apparatus in the long run. This pressure on the nose and head can also lead to headache and other discomfort.

Therefore, there is a need to improve the display apparatus of the above-mentioned type so as to ensure that the display apparatus fits securely and, at the same time, comfortably when being worn on a user's head.

SUMMARY OF THE INVENTION

The present invention is directed to a display apparatus comprising an image module and a spectacle-like frame wherein the display apparatus includes at least one of the temples having a holding element shiftably mounted thereon, which holding element comprises a first portion extending downwards from the temple. The shiftability of the holding element allows individual, optimal positioning, of the holding element behind the ear in the region of the temporal bone for each user. In particular, the holding element is shiftable in the longitudinal direction of the temple. This allows the position of the holding element to be individually adapted for each user such that the holding element abuts against the temporal bone region directly behind the ear when the display apparatus is mounted.

Further, the holding element can comprise a second portion connected to the lower end of the first portion, the second portion extending from the lower end in a direction pointing away from the front portion of the display apparatus. Because the second portion extends from the lower end of the first portion in a direction pointing away from the front portion, a large area of abutment with the holding element can be achieved. At the same time, this does not lead to an increased need for space for the HMD apparatus, because the second portion is preferably substantially parallel to the temple. If the second portion extended downwards in the same manner as the first portion, the holding element would extend downwards an undesired distance away from the temple.

The holding element's internal surface, which abuts against the user's head behind the ear when the display apparatus is mounted on the user's head, has a convex curvature at first, in the region of the first portion, in a direction pointing away from the temple (i.e. downwards from the temple), which convex curvature then passes over into a concave curvature. Further, the internal surface can have a convex curvature in the region of the second portion, in a direction extending away from the first portion, which convex curvature then passes into a concave curvature. The above-described design of the internal surface in the region of the first portion allows optimum engagement of the holding element by the groove behind the ear (the region of the temporal bone behind the auditory canal). Due to the convex curvature in the region of the second portion, this leads to the holding element being virtually hooked to the groove behind the ear. The adjoining convex curvature of the second portion is an adaptation to the shape of the head which tapers towards the rear again, thus achieving a positive wedge effect counteracting a forward sliding movement of a display apparatus over the nose.

Further, in the region of the second portion, the internal surface of the holding element can have a concave curvature in a direction pointing away from the temple. This is a further anatomical adaptation of the internal surface design to the groove behind the ear.

Together, the two portions of the holding element form a substantially L-shaped arrangement. This arrangement provides a holding element that is compact, on the one hand, and can ensure optimum support of the display apparatus, on the other hand.

The display apparatus also comprises a locking mechanism by which an adjusted shifting position of the holding element can be locked relative to the temple. Several shifting positions are possible, of course, so that individual adaptation to the respective user can be effected. The shifting positions can be either predetermined shifting positions with predetermined distances between them, or continuously sliding shifting. The locking mechanism can be effected, for example, by interlocking and/or friction locking. Further, the holding element can be connected to the temple of the spectacles in a telescoping manner, so as to achieve the desired shiftability.

Further, the holding element is preferably shiftable towards the temple such that shifting is possible only in a longitudinal direction of the temple. For example, shifting only along a longitudinal direction prevents rotation about the longitudinal direction or axis. The holding element can comprise a slide, which engages in two guide grooves that extend in a longitudinal direction on both sides of the temple. The holding element can be relatively thick and rigid.

Further, the holding element can be elastically pretensioned in a direction transverse to the temple. If the holding element is rigid, spring pretension can be achieved. As an alternative, it is possible for the elastic pretension to be achieved by the inherent elasticity of the holding element.

Each temple of the display apparatus can have a holding element shiftably mounted to that particular temple, wherein each holding element comprises one or more of the above-described features. Of course, the holding element for the right ear is adapted to the corresponding anatomy of the head in the region of the right ear, and the holding element for the left ear is adapted to the corresponding anatomy of the head in the region of the left ear.

The display apparatus image module for generating the image can generate the image as a virtual image such that a user can perceive it at a predetermined distance in front of the eye when the user is wearing the display apparatus on his head in the manner of spectacles. In particular, the image module can be designed as in known HMD apparatuses. Further, the image module can comprise a control device which controls an image-generating element of the image module on the basis of predetermined image data such that the desired image is generated. The image module can further comprise imaging optics for imaging the image generated by means of the image-generating element.

It will be appreciated that the aforementioned features and those yet to be explained below can be used not only in the combinations set forth herein, but also in other combinations, or alone, without departing from the scope of the present invention. The above summary of the various representative features and embodiments of the invention is not intended to describe each embodiment or every implementation of the invention. Rather, the embodiments are described so that others skilled in the art may appreciate and understand the principles and practices of the invention. The figures in the detailed description that follows more particularly exemplify these embodiments.

BRIEF DESCRIPTION OF THE DRAWINGS

These as well as other objects and advantages of this invention will be more completely understood and appreciated by referring to the following more detailed description of the exemplary embodiments of the invention in conjunction with the accompanying drawings. The invention will be explained in more detail below, by way of example and with reference to the enclosed drawings, which also disclose features essential to the invention and wherein.

DETAILED DESCRIPTION OF EMBODIMENTS OF THE INVENTION

Figure 1:
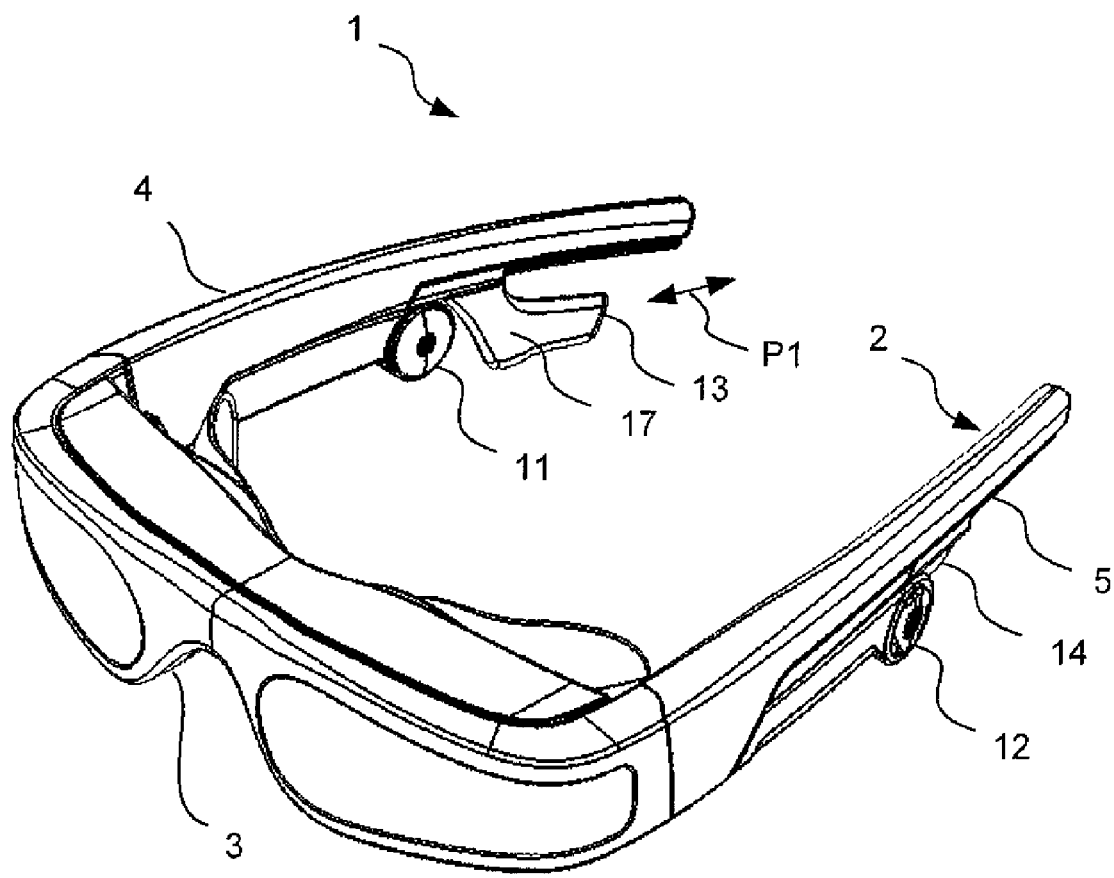
FIG. 1 shows a perspective view of an embodiment of the display apparatus according to the invention.

In the embodiment shown in FIGS. 1-10, the display apparatus 1 according to the invention comprises a spectacle-like frame 2, including a front portion 3 which comprises a nose support 30, and two temples 4, 5.

Figure 2:
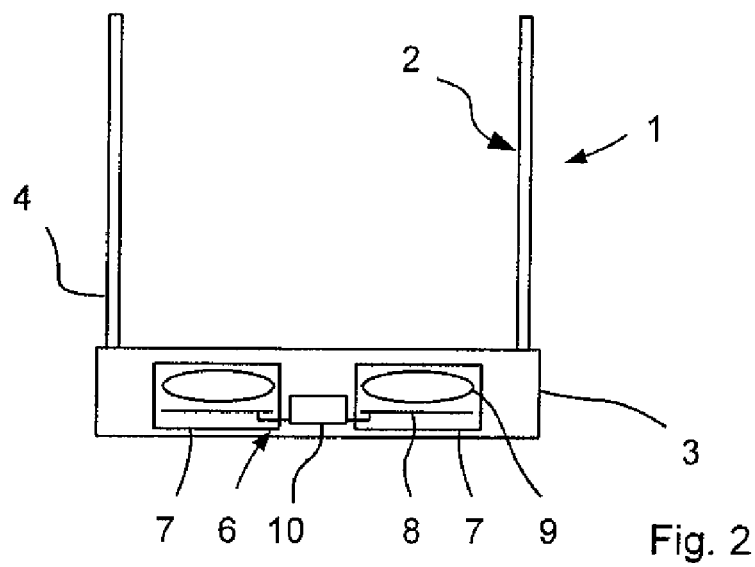
FIG. 2 shows a schematic top view of the display apparatus of FIG. 1.
Figure 3:
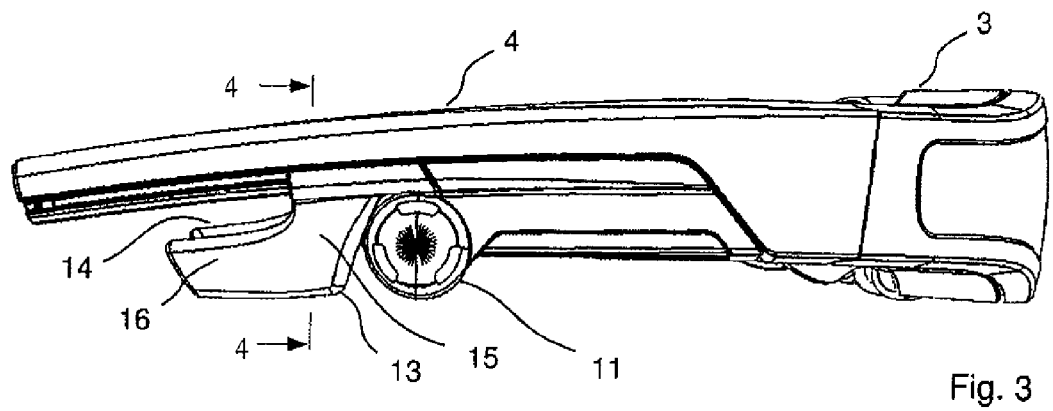
FIG. 3 shows a lateral view of the display apparatus of FIG. 1.
Figure 4:
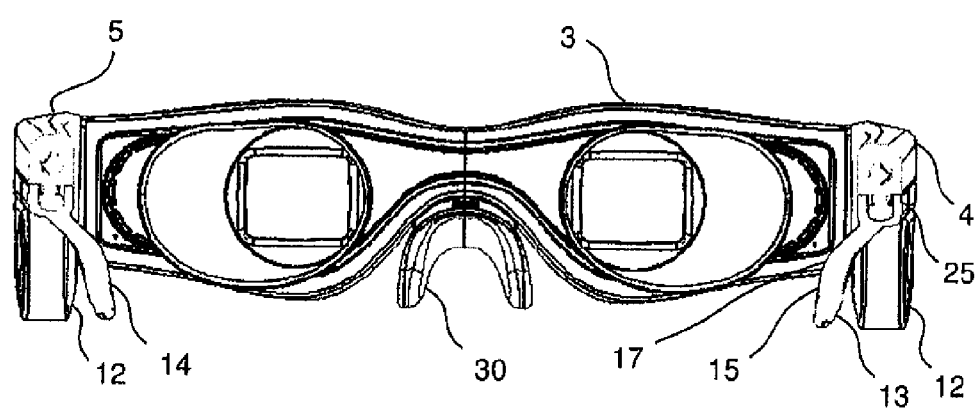
FIG. 4 shows a partial sectional view along the cut line 4-4 of FIG. 3.
Figure 5:
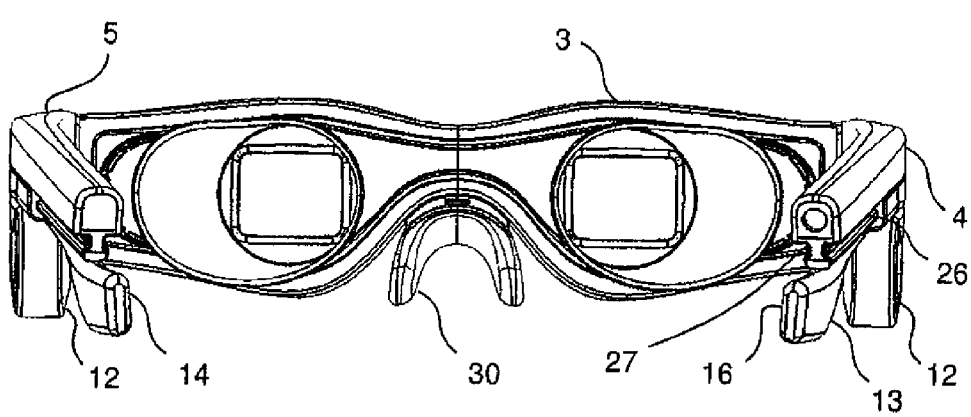
FIG. 5 shows a rear view of the display apparatus of FIG. 1.
Figure 6:
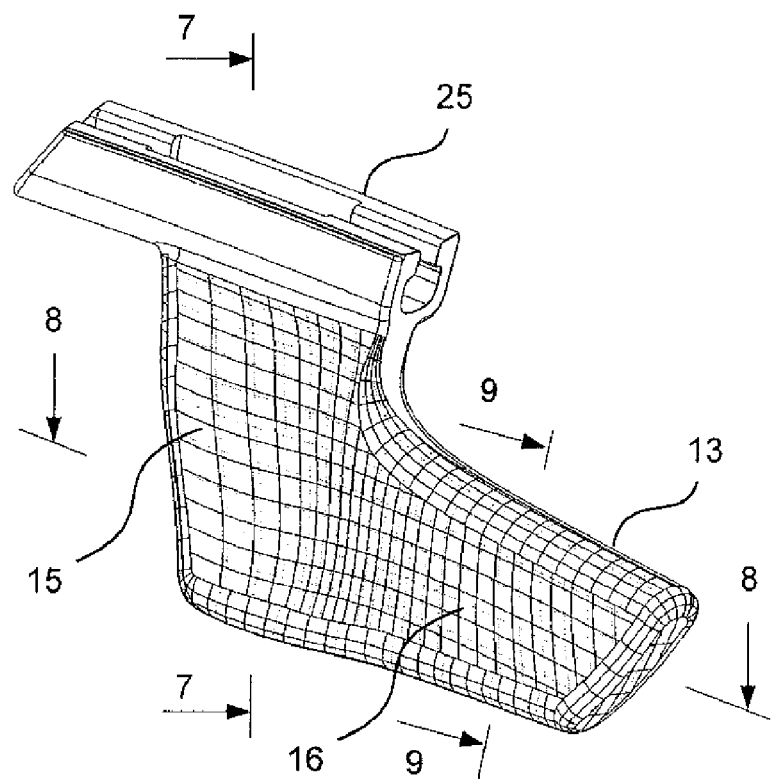
FIG. 6 shows an enlarged perspective view of the holding element 13.
Figure 7:
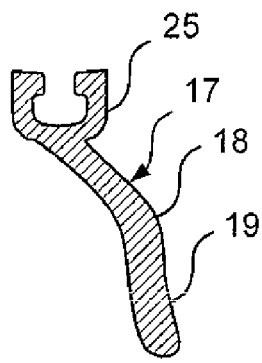
FIG. 7 shows a sectional view along the cut line 7-7 in FIG. 6.

As is evident from the schematic representation in FIG. 2, the front portion 3 contains an image module 6, which comprises, for each eye of a user wearing the display apparatus 1, a display unit 7 with an image-generating element 8 and imaging optics 9. The image module 6 further includes a control unit 10, which controls the display units 7 on the basis of predetermined image data so as to generate the desired images. For example, the image data can be supplied to the control unit 10 via a signal line, not shown, which extends through the right temple 4.

Each temple 4, 5 has mounted to it an earphone 11, 12 which can be swiveled down and whose spacing from the front portion 3 can be adjusted. Further, each temple has a holding element 13, 14 shiftably mounted to it, as indicated by the double arrow P1 in FIG. 1. The two holding elements 13 and 14 are designed with mirror symmetry to one another; therefore, a detailed description will be given hereinafter only of the holding element 13 for the right ear.

The holding element 13 has a substantially L-shaped design and comprises a first portion 15, which extends downwards from the right temple 4, as well as an adjoining second portion 16 extending away from the front portion 3. The internal surface 17 (FIG. 1) of the holding element 13 is provided and formed such that it abuts against the region of the temporal bone behind the auricle when a user is wearing the display apparatus 1 in the manner of spectacles. The shiftability of the holding element 13 relative to the temple 4 allows individual positioning of the holding element 13 directly behind the ear (in the region of the so-called groove behind the ear) for each user.

In order to achieve, if possible, optimum abutment of the holding element 13 against the groove behind the ear, the internal surface 17 comprises, in a downward direction from the temple 4, first a convex curvature region 18 in the region of the first portion 15 with a concave curvature region 19 adjoining the convex curvature region. Both regions 18 and 19 are visible, in particular, in the sectional views 4 and 7 as well as in the enlarged perspective view of the holding element 13 in FIG. 6. This design of the first portion 15 allows good engagement of the holding element 13 in the groove behind the ear.

The holding element 13 is further designed such that the internal surface 17 comprises, in the region of the second portion 16 and in a direction pointing away from the first portion 15, first a convex curvature region 20 followed by a concave curvature region 21. The convex curvature region 20 serves to engage in the groove behind the ear. Due to the adjoining concave curvature region 21, there is an adaptation to the rearwardly tapering shape of the head. This results in a positive wedge effect which counteracts forward sliding of the display apparatus over the user's nose. The concave contour 21 of the second portion 16 of the holding element 13 is also visible in FIG. 5.

Figure 9:
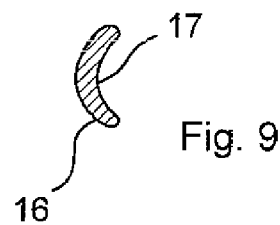
FIG. 9 shows a sectional view along the cut line 9-9 in FIG. 6.
Figure 8:
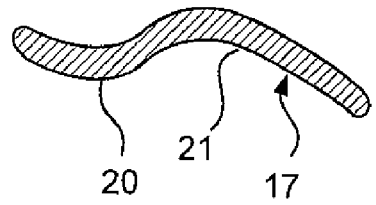
FIG. 8 shows a sectional view along the cut line 8-8 in FIG. 6.

The internal surface 17 has a concave curvature in the region of the second portion 16, perpendicular to the longitudinal direction of the second portion 16, as is evident, in particular, from the sectional view of FIG. 9. This curvature is selected such that it is anatomically adapted to the corresponding contour of the head.

On the whole, the holding element 13 thus has a shape which is optimally adapted anatomically. This achieves a secure, comfortable fit of the display apparatus 1 and prevents it from sliding down over the user's nose.

Figure 10:
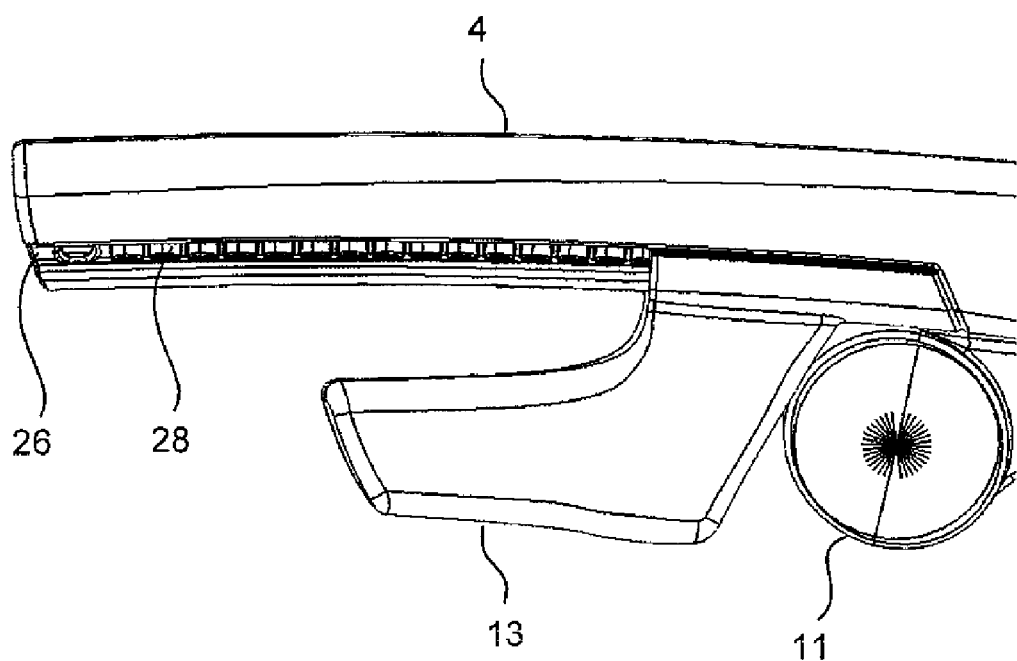
FIG. 10 shows an enlarged view of a detail of the temple 4 together with the holding element 13.

In order to ensure the shiftability of the holding element 13 relative to the temple 4, the holding element 13 comprises, at the upper end of the first portion 15, a guide 25 which engages in two guiding grooves 26, 27 (FIG. 5) on both sides of the temple 4. The enlarged detail of FIG. 10 shows the visible guiding groove 26.

A locking mechanism is provided for secure locking of the selected shifting position of the holding element 13 relative to the temple 4. Thus, the guiding groove 26 can comprise several locking recesses 28, which are spaced apart in the longitudinal direction of the temple 4 and in which a corresponding counterpart on the guide 25 engages. For example, the corresponding counterpart can be a material elevation (not shown), which is formed integrally with the guide 25 and enters into engagement with the locking recesses 28 in an interlocking, yet resilient manner. However, a separate spring element (not shown) can be provided on the guide 25. The locking recesses can also be formed on the holding element 13 and the corresponding engaging counterpart on the temple 4.

In order to keep the weight of the display apparatus as low as possible, particularly the front portion 3, the two temples 4 and 5, as well as the holding elements 13 and 14, can be made from plastics. The holding elements 13 and 14 can be either rigid or flexibly resilient in order to ensure not only the already present anatomic shape, but also optimal adaptation of the holding elements 13 and 14 to the user's head.

The locking of the holding elements 13, 14 relative to the temple 4, 5 can be effected not only by the described type of locking, but also by friction locking. In particular, fixation can be achieved by use of a screw, which is tightened in the desired shifting position.

The described design of the holding element 13, 14 as substantially L-shaped results in the advantage that an extremely secure, comfortable fit is achieved in the mounted condition and, at the same time, the display apparatus is also extremely compact, because the longer part (second portion 16) extends parallel to the temple 4 and away from the front portion 3.

In the display apparatus according to the invention, the two holding elements 13 and 14 can be shifted and positioned independently of each other, allowing individual adjustment to the user's left and right ear. The user will usually tend to position both holding elements 13 and 14 at the same shifting positions on both temples. Thus, for example, an identical distance of the holding elements 13 and 14 from the front portion 3 or from the rotary-joint connection of the temples 4, 5 with the front portion 3, respectively, will be selected. In order to facilitate this, a respective scale can be provided on each internal surface of the temples 4, 5. The holding elements 13 and 14 comprise a mark (e.g. a line or a corresponding geometry, such as an arrow, a notch, or a corner, for example), which can be made to register with a desired line on the scale of the respective temple 4, 5. Thus, this scale allows adjustment of the same or certain different positions for the holding elements 13, 14 on the left and on the right.

The scale can be printed, embossed or molded in the temple. It is also possible to use the locking recesses 28 as a scale. The scale can be labeled, in particular, in units of length measurement, measured from the rotary joint between the temple 4, 5 and the front portion 3 (e.g. 60 mm, 65 mm, 70 mm, . . . ). The labeling can also include a numbering of the individual locking recesses 28.

Instead of the rail-type guide 25 in combination with the locking grooves 26 and 27, the holding elements 13 and 14 can be connected with the temple 4, 5 in a telescope-like, that is, telescoping, manner.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents.

We claim:

1. A display apparatus, comprising:
an image module for generating an image;
a frame to which the image module is affixed, wherein the frame comprises a front portion including a nose support, and two lateral temples mounted to the front portion; and
at least one holding element shiftably mounted to at least one of the temples, wherein the holding element comprises a first portion extending downwards from the temple;
wherein an internal surface of the at least one holding element is abuttingly engageable with a user's head behind the user's ear when the display apparatus is mounted on the user's head; and
wherein each temple has a respective holding element shiftably mounted to the respective temple.

2. The display apparatus of claim 1, wherein the at least one holding element is shiftable along the longitudinal direction of the temple.

3. The display apparatus of claim 1 wherein the internal surface comprises an arcuate surface in the region of the first portion in a direction extending away from the temple, wherein a first section of the arcuate surface is convex and an adjacent second section of the arcuate surface is concave.

4. The display apparatus of claim 1, wherein the at least one holding element comprises a second portion connected with a lower end of the first portion, the second portion extending from the lower end of the first portion in a direction pointing away from the front portion.

5. The display apparatus of claim 4, wherein the internal surface comprises an arcuate surface in the region of the second portion in a direction extending away from the first portion, wherein a first section of the arcuate surface is convex and an adjacent second section of the arcuate surface is concave.

6. The display apparatus of claim 4 wherein an internal surface comprises a concave curvature in the region of the second portion in a direction extending away from the temple.

7. The display apparatus as claimed in claim 4, wherein the internal surface comprises an arcuate surface in the region of the second portion in a direction extending away from the first portion, wherein a first section of the arcuate surface is convex and an adjacent second section of the arcuate surface is concave and the internal surface further comprises a concave curvature in the region of the second portion in a direction extending away from the temple.

8. The display apparatus of claim 4 wherein together the first portion and the second portion of the at least one holding element have a substantially L-shaped arrangement.

9. The display apparatus of claim 1 further comprising a locking mechanism wherein the locking mechanism can lock an adjusted displacement position of the at least one holding element relative to the temple.

10. The display apparatus of claim 9 wherein the locking mechanism effects locking by form fit.

11. The display apparatus of claim 9 wherein the locking mechanism effects locking by friction locking.

12. The display apparatus of claim 9 wherein the locking mechanism effects locking by form fit and friction locking.

13. The display apparatus of claim 1 wherein the at least one holding element is elastically pre-tensioned in a direction transverse to the temple.

14. The display apparatus of claim 13 wherein the elastic pre-tensioning is achieved by the inherent elasticity of the at least one holding element.

15. A display apparatus, comprising:

an image module for generating an image;

a frame to which the image module is affixed, wherein the frame comprises a front portion including a nose support, and two lateral temples mounted to the front portion; and at least one holding element shiftably mounted to at least one of the temples, wherein the holding element comprises a first portion extending downwards from the temple;

wherein an internal surface of the at least one holding element is abuttingly engageable with a user's head behind the user's ear when the display apparatus is mounted on the user's head;

wherein the internal surface comprises an arcuate surface in the region of the first portion in a direction extending away from the temple, wherein a first section of the arcuate surface is convex and an adjacent second section of the arcuate surface is concave;

wherein the at least one holding element comprises a second portion connected with a lower end of the first portion, the second portion extending from the lower end of the first portion in a direction pointing away from the front portion; and wherein the internal surface comprises an arcuate surface in the region of the second portion in a direction extending away from the first portion, wherein a first section of the arcuate surface is convex and an adjacent second section of the arcuate surface is concave.

16. A display apparatus, comprising:

an image module for generating an image;

a frame to which the image module is affixed, wherein the frame comprises a front portion including a nose support, and two lateral temples mounted to the front portion; and at least one holding element shiftably mounted to at least one of the temples, wherein the holding element comprises a first portion extending downwards from the temple wherein an internal surface of the at least one holding element is abuttingly engageable with a user's head behind the user's ear when the display apparatus is mounted on the user's head;

wherein the internal surface comprises an arcuate surface in the region of the first portion in a direction extending away from the temple, wherein a first section of the arcuate surface is convex and an adjacent second section of the arcuate surface is concave;

wherein the at least one holding element comprises a second portion connected with a lower end of the first portion, the second portion extending from the lower end of the first portion in a direction pointing away from the front portion;

wherein the internal surface comprises an arcuate surface in the region of the second portion in a direction extending away from the first portion, wherein a first section of the arcuate surface is convex and an adjacent second section of the arcuate surface is concave; and wherein each temple has a respective holding element shiftably mounted to the respective temple.

* * * * *